United States Patent [19]

Du Rocher

[11] Patent Number: 5,049,706

[45] Date of Patent: Sep. 17, 1991

[54] MULTIFUNCTION STEERING COLUMN SWITCH

[76] Inventor: Daniel J. Du Rocher, 1200 Low Wood Trail, Leonard, Mich. 48367

[21] Appl. No.: 529,096

[22] Filed: May 25, 1990

[51] Int. Cl.⁵ .............................................. H01H 9/00
[52] U.S. Cl. ................................ 200/61.54; 200/61.27
[58] Field of Search .............. 200/4.5 R, 61.27–61.38, 200/61.54

[56] References Cited

U.S. PATENT DOCUMENTS

| | | | |
|---|---|---|---|
| 3,459,913 | 8/1969 | Mutschler et al. | 200/166 |
| 3,476,896 | 11/1969 | Schreiber | 200/61.54 |
| 3,719,787 | 3/1973 | Tomecek | 200/61.27 |
| 3,892,932 | 7/1975 | Erdelitsch et al. | 200/61.27 |
| 3,940,579 | 2/1976 | Bühl et al. | 200/4 |
| 4,129,757 | 12/1978 | Cryer | 200/61.27 X |
| 4,277,658 | 7/1981 | Delp et al. | 200/61.54 |
| 4,291,213 | 9/1981 | Felland et al. | 200/335 |
| 4,327,264 | 4/1982 | Botz et al. | 200/295 |
| 4,379,954 | 4/1983 | Iwata et al. | 200/62.27 X |
| 4,400,598 | 8/1983 | Jandl et al. | 200/16 D |
| 4,404,438 | 9/1983 | Honjo | 200/61.27 X |
| 4,543,848 | 10/1985 | Beauch | 200/61.54 X |
| 4,648,728 | 3/1987 | Erdelitsch et al. | 384/537 |
| 4,678,875 | 7/1987 | Erdelitsch et al. | 200/61.54 |
| 4,739,130 | 4/1988 | Roller et al. | 200/61.27 |
| 4,791,253 | 12/1988 | Erdelitsch et al. | 200/61.27 |
| 4,810,839 | 3/1989 | Chretien | 200/61.27 X |

FOREIGN PATENT DOCUMENTS

| | | |
|---|---|---|
| 2620192 | 4/1979 | Fed. Rep. of Germany . |
| 3122353 | 1/1983 | Fed. Rep. of Germany . |
| 3128752 | 10/1984 | Fed. Rep. of Germany . |
| 1327040 | 8/1973 | United Kingdom . |

Primary Examiner—J. R. Scott
Attorney, Agent, or Firm—Robert P. Seitter; J. Gordon Lewis

[57] ABSTRACT

A switch for use on the steering column of a vehicle includes lever operated switch members controlling vehicle operating circuits. A switch lever is mounted in a housing attachable to the steering column of a vehicle for movement in one of two mutually separate planes and/or rotation about a longitudinal axis extending through the switch lever. Actuators are mounted in the housing and are independently responsive to one of the modes of movement of the switch lever for controlling a separate switch member mounted in the housing. Each switch member carries electric contacts which are selectively engaged by contacts carried by a driven member in the switch member as the switch member switches position in response to movement by the associated actuator to effect switching of the connections for a particular vehicle operating circuit.

11 Claims, 7 Drawing Sheets

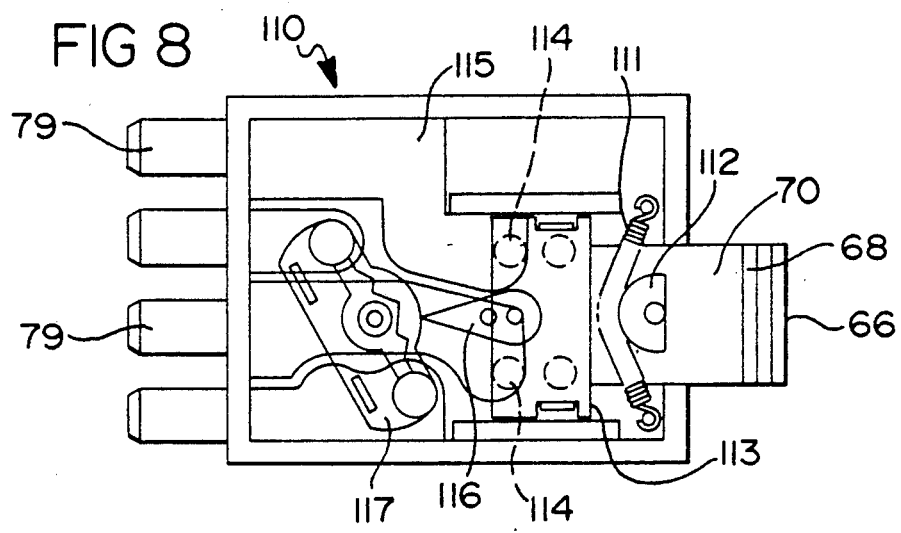
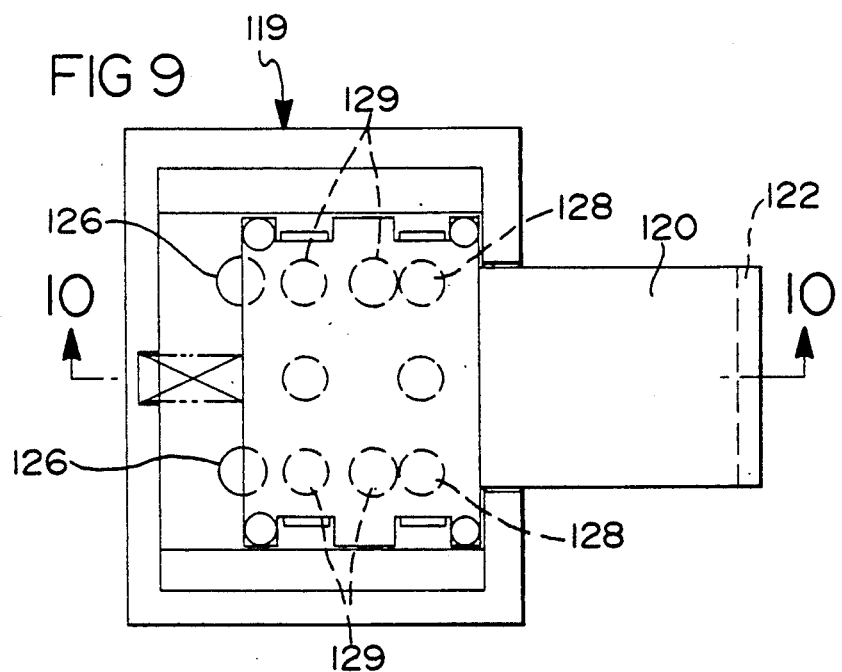
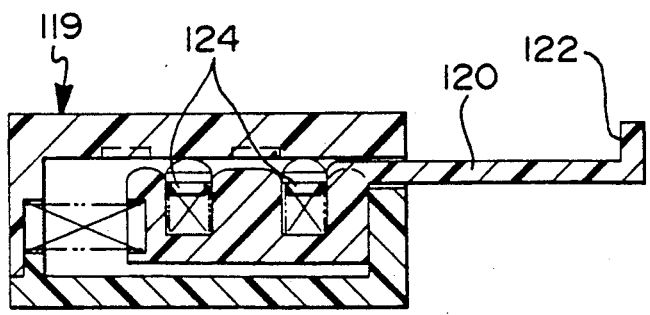

MULTIFUNCTION STEERING COLUMN SWITCH

BACKGROUND OF THE INVENTION

1. Field of the Invention

The present invention relates, in general, to switches and, specifically, to switches mounted on the steering column of a motor vehicle for controlling a plurality of switch members connected to various vehicle operating circuits.

2. State of the Art

The evolution of steering column switches in motor vehicles has been toward greater integration of functions in a single switch. Previously, a plurality of individual switches, each controlling a single function, i.e., turn signals, were mounted on the vehicle dashboard, steering column, etc. Current steering column switches are designed to control a variety of functions or vehicle operating circuits, for example, turn signals/hazard lights, high beam and low beam headlights with optional flash to pass, parking lights, and windshield wiper and wash functions, including multi-speed wipers with or without delay.

Typically, a steering column switch includes a single lever or stalk pivotally mounted on one side of a housing attached to the steering column in an easily accessible position for the driver of the vehicle. The lever is gimballed at one end in the housing so as to move in one of two mutually separate planes. Further, the lever may be provided with a rotatable end cap as well as being slidable along its longitudinal axis. Actuators are mounted in the housing and, in response to movement of the lever in one direction, i.e., such as one of the two mutually separate planes, or rotation of the end cap, move a switching member carrying contacts between various switching positions to effect the switching of electrical connections for a particular vehicle operating circuit.

Due to the complex nature and the mechanical interconnection of the elements of the switch, including the actuators and switch members, installation, adjustment and repair costs of such steering column switches are high. The separation of the various functions of the steering column switch into sub-assemblies simplifies the design, assembly and testing of the steering column switch since each subassembly can be handled independently prior to final assembly. However, the sub-assemblies are still highly mechanically dependent upon each other in a fully assembled condition. Furthermore, such steering column switches are specifically designed for a single configuration and use. Changes in the design of any of the sub-assemblies necessitates changes in the other sub-assemblies thereby increasing design and development costs and complicating the final assembly and adjustment of the steering column switch.

In addition, each vehicle manufacturer typically manufactures a variety of different vehicle styles and models, each containing various options which necessitate separate steering column switches for each vehicle and option configuration. This adds to overall tooling costs and requires special tools and installation procedures for each specific steering column switch. Further complicating the steering column switch design is the different requirements of the U.S. and European markets for vehicle operating circuits, such as turn signals, head lamps, high and low beams, wiper/wash, etc. Since car lines are evolving into worldwide markets, different steering column switches are required to meet each different market requirements thereby increasing design and tooling costs due to the number of different configurations which are required.

Thus, it would be desirable to provide a multifunction steering column switch which overcomes the deficiencies found in previously devised steering column switches. It would also be desirable to provide a steering column switch which includes mechanically separately mounted and separately operating sub-assemblies for each vehicle operating function controlled by the steering column switch. It would also be desirable to provide a steering column switch which includes plug-in switch members which may be mounted in a variety of positions to increase the number of applications of the steering column switch. Finally, it would be desirable to provide an actuator and switch member for a steering column switch which can be easily redesigned and/or repositioned for use in steering column switches on different vehicles and vehicle configurations.

SUMMARY OF THE INVENTION

The present invention is a multifunction steering column switch for a vehicle having a steering column and at least two energizable devices, including high and low beam headlights, right and left turn signals, parking lights, side marker lights, a flashing light indicator, windshield wipers or windshield wash devices.

The steering column switch includes a housing mountable on a steering column of a vehicle. A switch lever is mounted in and extends outward from the housing. The switch lever is mounted in the housing for at least one of two separate pivotal movements in first and second mutually separate planes. The switch lever or a portion thereof may also be mounted for rotational movement about its longitudinal axis.

A plurality of actuator means are mounted in the housing. Each actuator means is independently constructed and operated and is responsive to movement of the switch lever in one of the first and second mutually separate planes and the rotational movement of an end portion of the switch lever. A plurality of switch means are removably attached to the housing. Each switch means is coupled to and responsive to one of the actuator means and is switchable between positions upon movement of the actuator means to selectively connect electric potential to or generate signals for one of the vehicle operating circuits to energize or de-energize one of the vehicle energizable devices connected thereto depending upon the mode of movement of the switch lever.

In a preferred embodiment, at least two actuator means are mounted in the housing and responsive to the pivotal movement of the switch lever in one of the two mutually separate planes or rotation of an end portion of the switch lever. The actuator means converts such movement of the switch lever into rotation and/or linear displacement of the switch means to move the switch means and the contacts carried by the switch means between positions to energize or de-energize selected vehicle operating circuits.

The multifunction steering column switch of the present invention overcomes many of the deficiencies found in previously devised steering column switches in that the design, development, installation, adjustment and repair of the steering column switch is simplified and less time consuming. By uniquely providing independently operated actuator means responsive to one selected movement of the switch lever and plug-in switch means associated with each actuating means, any design changes during the development of the steering column switch can be easily made to any of the switch means or actuator means without affecting the design of other switch means or actuators means or necessitating a redesign of the entire steering column switch. A number of different switch means or modules can be designed to operate within the same mounting and mechanical operating constraints so as to provide a different number of functions, such as three, four or five wire wiper systems or three different wash/wiper systems, one for variable interval, one for fixed interval and one for two-speed systems. In this manner, a large variety of different steering column switch configurations can be easily designed for use in many different vehicles and vehicle lines with minimal impact on component or assembly tooling costs.

A further advantage is that the electrical function controlled by each switch means or module is not necessarily restricted to a given mechanical input or actuator design. For example, in some vehicles, the wash/wiper function is controlled by a rotatable knob on the end of the switch lever. If a headlight switch module is designed with the same mechanical interface or actuator as the wash/wiper switch module, then the rotary motion of the knob on the switch lever could operate either the wash/wiper module or the headlight switch module. Since both modules are designed to operate with the same actuator interface and mount in the same fashion, they are completely interchangeable and the same tooling, with the exception of a different switch module, will support an even larger number of different steering column switch applications.

The multifunction steering column switch of the present invention is also applicable to dual switch lever applications which would allow an even greater number of combination of functions.

BRIEF DESCRIPTION OF THE DRAWING

The various features, advantages and other uses of the present invention will become more apparent by referring to the following detailed description and drawing in which:

FIG. 3 is a left side elevational view of one embodiment of a windshield wiper switch means shown in FIG. 2;

FIG. 8 is a left side elevational view of another embodiment of a beam change and flash to pass switch means employable in the steering column switch of the present invention;

FIG. 9 is a left side elevational view of another embodiment of the beam change and flash to pass switch means;

FIG. 10 is a cross sectional view generally taken along line 10—10 in FIG. 9;

DESCRIPTION OF THE PREFERRED EMBODIMENTS

Figure 1:
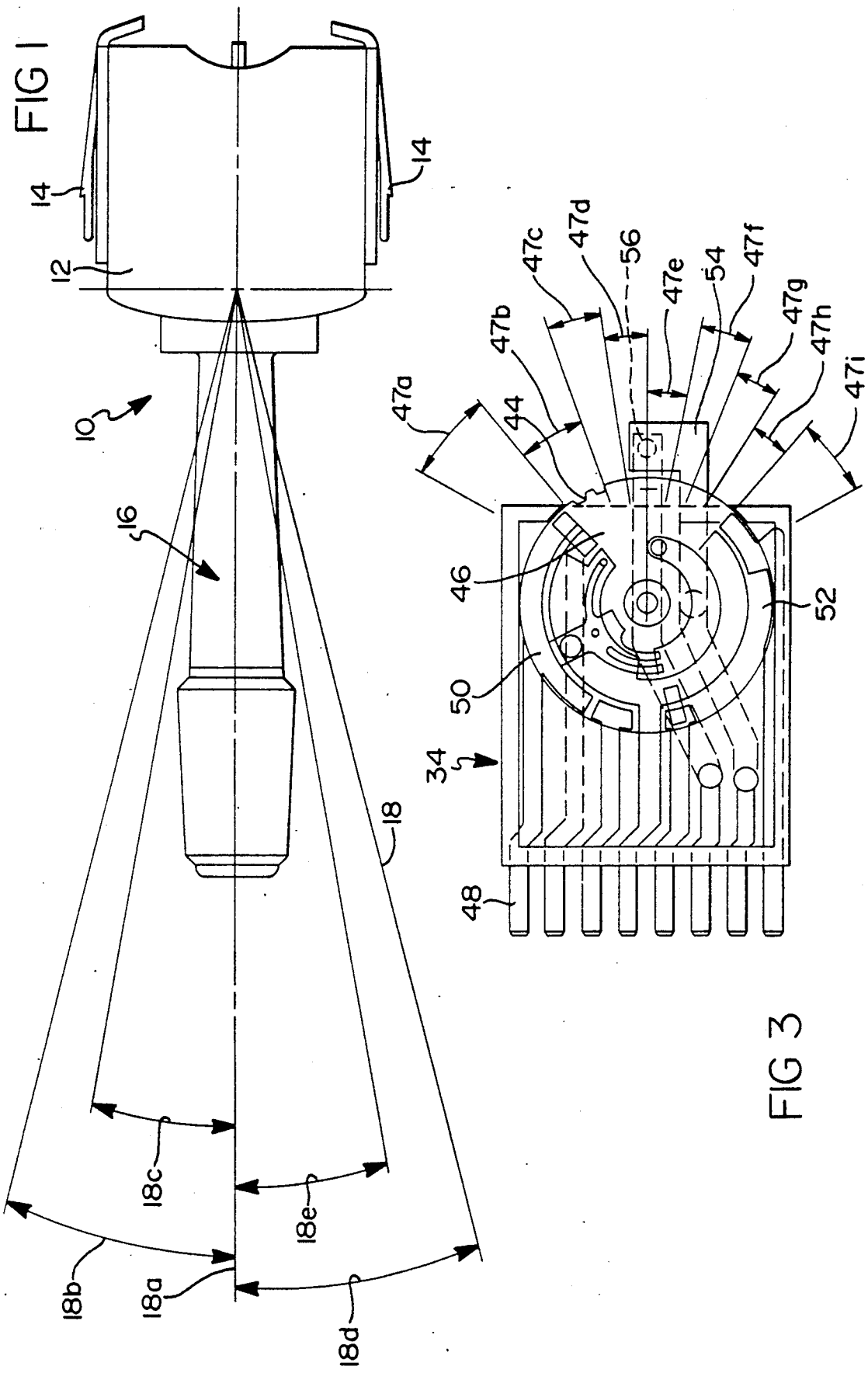
FIG. 1 is a front elevational view of one embodiment of the multifunction steering column switch of the present invention shown in a normal mounting position on the steering column of a vehicle.

Throughout the following description and drawing, an identical reference number is used to refer to the same component shown in multiple figures of the drawing.

Figure 2:
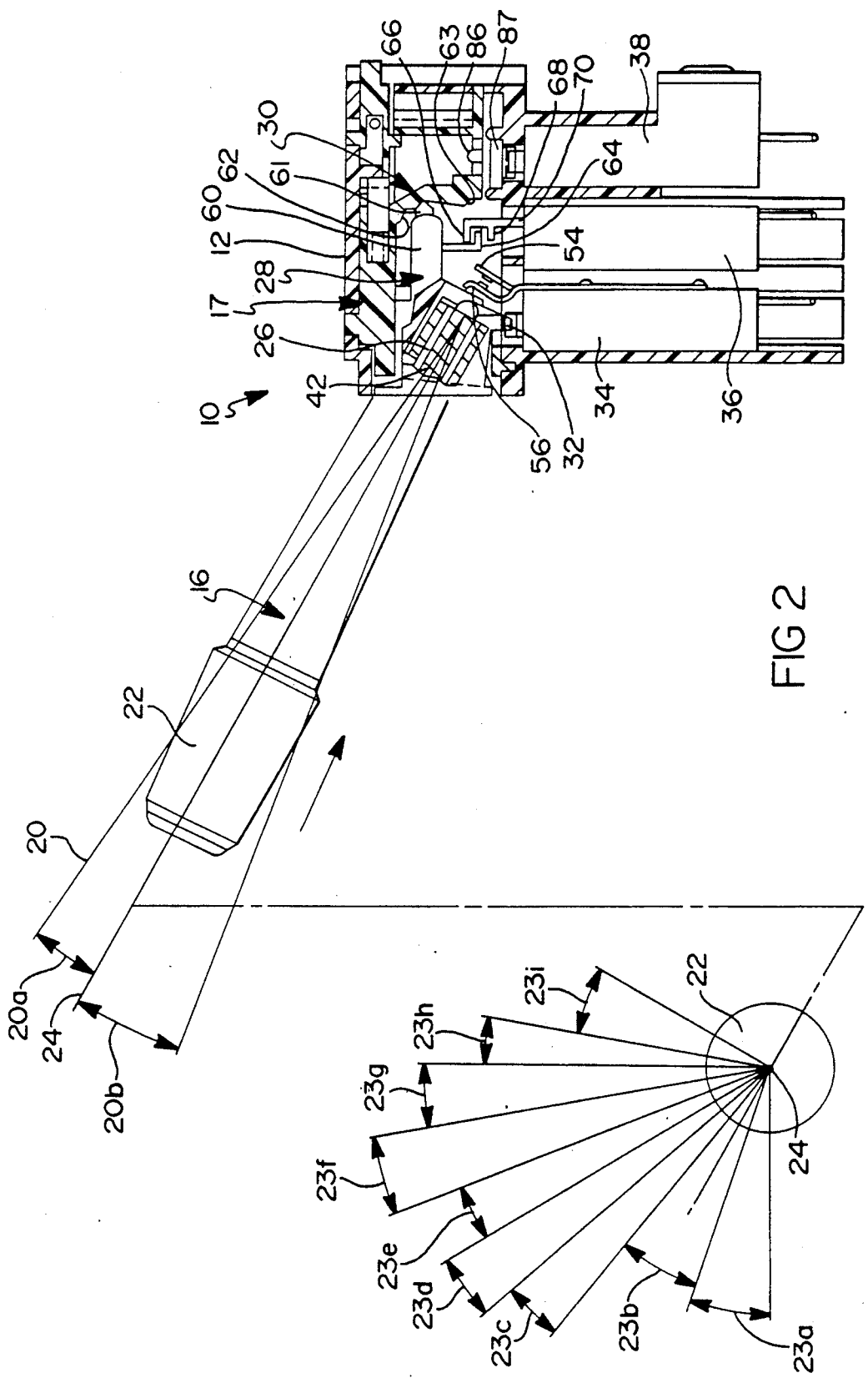
FIG. 2 is a partially cross sectioned, plan elevational view of the steering column switch shown in FIG. 1.

Referring now to the drawing, and to FIGS. 1 and 2 in particular, there is illustrated a multifunction steering column switch 10 constructed in accordance with the teachings of one embodiment of the present invention. The steering column switch 10 includes a housing 12 which is adapted to be mounted to one side, such as the left side, of the steering column of a motor vehicle. Any suitable mounting means, such as a pair of clips 14, may be employed to attach the housing 12 to the steering column (not shown). The housing 12 comprises a hollow, plastic body which contains the remainder of the individual components of the steering column switch 10.

A switch lever or stalk 16 is connected to a rotor 17 which is movably mounted within the housing 12. The lever 16 includes a pair of trunnions, not shown, which extend outward from either side of one end of the lever 16 to engage bores formed in the rotor 17 to provide one direction or plane of pivotal movement of the lever 16 and rotor 17. Further, a pin carried by a cover, not shown, which closes the housing 12 engages a bore in the rotor 17 to pivotally mount the rotor 17 and the switch lever 16 for pivotal movement in a second, perpendicular plane. The lever 16 extends outward from one side of the housing 12, as shown in FIGS. 1 and 2.

The switch lever 16 is adapted for pivotal movement in two mutually separate planes. Preferably, and by way of example only, the two planes are perpendicular. The first plane, denoted by reference number 18 in FIG. 1, is substantially vertical with respect to the driver of the vehicle in which the steering column switch 10 is mounted. The second plane, denoted by reference number 20 in FIG. 2, extends substantially fore and aft with respect to the driver and is preferably perpendicular to the first plane 18. In the first plane 18, the switch lever 16 is movable from a normal center position 18a to either one or more angularly disposed positions 18b, 18c, 18d, or 18e on either side of the center position 18a. In the second plane 20, the switch lever 16 is movable from a normal center position shown by its longitudinal axis 24 to angular positions 20a and 20b on either side of the center position.

In one embodiment, described in greater detail hereafter, a rotatable end portion 22, such as an end cap, is mounted on the exterior end of the switch lever 16. The rotatable end cap 22 is mounted for rotary movement about a longitudinal axis 24 extending through the switch lever 16. The rotatable end cap 22 is rotatable in varying incremental amounts, as shown by reference numbers 23a to 23i in FIG. 2.

A plurality of actuator means, such as actuator means 26, 28 and 30, are mounted in the housing 12. Each of the actuator means 26, 28 and 30 is mechanically interconnected to the switch lever 16 and is independently responsive to movement of the switch lever 16 in one of the two mutually perpendicular planes 18 and 20 or the rotation of the end cap 22 about the longitudinal axis 24 of the switch lever 16. Each of the actuator means 26, 28 and 30 includes an output member, such as output member 32 for the actuator means 26, which engages a driven member in a switch means operably coupled to the actuator means 26, 28 or 30, as shown in FIG. 2 and removably attached to the housing 12. Thus, the switch means 34 is operably coupled to the actuator means 26, the switch means 36 is operably coupled to the second actuator means 28 and the third switch means 38 is operably coupled to the third actuator means 30. It will be understood that more or less actuator means and switch means may be contained within a single the housing 12.

The first actuator means 26 includes an output member 32 in the form of a sector gear which is fixedly mounted about one end of an actuating rod 42. The rod 42 is fixedly coupled to the rotatable end cap 22 on the switch lever 16 and is rotatable with rotation of the end cap 22. The actuating rod 42 is keyed or otherwise slidably connected to the sector gear 32 via a key slot, not shown, to permit axial movement of the actuating rod 42 to activate the windshield wash function of the vehicle, as described hereafter. The output member 32 engages gear teeth 44, shown in FIG. 3, of a driven member 46 in the switch means 34. In this manner, rotation of the end cap 22 is transmitted through the first actuator means 26 to rotation of a driven member 46 in the first switch means 34.

The first switch means 34, as shown in FIG. 3, has been designated by example only for use in controlling the windshield wiper and wash functions of a vehicle. Leads connected to terminals 48 in the first switch means 34 are connected by suitable conductors, not shown, to the windshield wiper and wash control devices on the vehicle.

The driven member or sector gear 46 is rotatably mounted in the housing of the first switch means 34. The sector gear 46 carries a plurality of arcuate shaped contacts, such as contacts 50 and 52. The contacts 50 and 52 have a predetermined shape and length so as to bridge and connect conductive pads attached to various terminals 48 extending outward from the housing of the first switch means 34 upon rotation of the sector gear 46. When the first switch means 34 is used to control a manual or automatically activated intermittent windshield wiper motor having various operating speeds between off, intermittent, low constant speed and high constant speed, rotation of the rotatable end cap 22 on the switch lever 16 causes a corresponding rotation of the sector gear 46 through angular positions 47a to 47i for example. This causes selected contacts 50 and 52, etc., to electrically connect certain pairs of leads extending from the terminals 48, thereby connecting electric potential to the windshield wiper motor on the vehicle.

As also shown in FIGS. 2 and 3, a momentary push to wash function is provided by the first switch means 34. A pair of spaced contacts 54 and 56 are mounted on the housing of the first switch means 34 and are connected to certain of the terminals 48 extending outward from the housing of the first switch means 34. Depression or pushing inward of the end of the rotatable end cap 22 on the switch lever 16 causes the end of the actuating rod 42 connected to the end cap 22 to move inwardly into the housing 12 and urge the contact 56 which is mounted on a leaf spring into electrical contact with the contact 54. This closes the circuit between the contacts 54 and 56 and causes an electric potential to be applied to the wash pump on the vehicle to apply windshield washer fluid to the windshield of the vehicle.

In the embodiment shown in FIG. 2, the second actuator means 28 is configured to control the operation of a second switch means 36, which has been designed to control the vehicle beam change (high or low beam) and flash to pass headlight circuits. A detailed illustration of the second switch means 36 is shown in FIG. 4.

The second actuator means 28 is responsive to movement of the switch lever 16 in the second plane, denoted by reference number 20 in FIG. 2. A projection 60 is mounted on the rotor 17. A spring biased detent 61 is mounted in and extends outward from the projection 60. The detent 61 engages a ramp formed in the rotor 17 and is normally positioned, as shown in FIG. 2, to select the low beam headlights in a two position, detent style, beam selector circuit. Pivotal movement of the switch lever 16 in one direction, such as in the plane 20, causes a pivotal movement of the switch lever 16 and rotor 17 in a direction to move the detent 61 counterclockwise, in the orientation shown in FIG. 2 until the detent 61 engages a recess 62 formed in the rotor 17. This position corresponds to activation of the vehicle high beam circuit. The switch lever 16 will remain in this position until returned to the center position by the operator of the vehicle. Rotation of the switch lever 16 in the opposite direction, or clockwise in the orientation shown in FIG. 2, causes the detent 61 to move along the ramp in the rotor 17 to a position shown by reference number 63 to momentarily energize the vehicle high beam headlights for a momentary flash to pass illumination of the headlights.

An arm 64 is connected to the projection 60 and extends outward therefrom, as shown in FIG. 2. The arm 64 is L-shaped and an end portion thereof is disposed between two spaced fingers 66 and 68 on a driven member or detent 70 extending outward from the second switch means 36.

Figure 4:
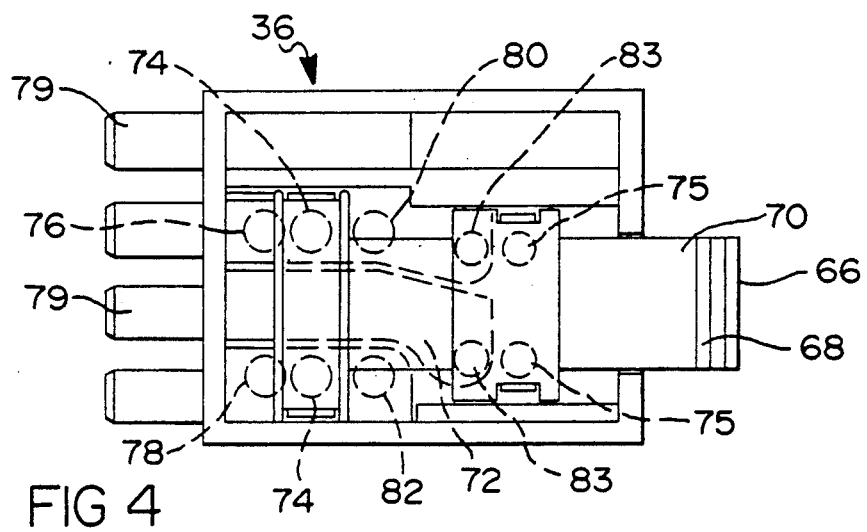
FIG. 4 is a left side elevational view of one embodiment of a beam change and flash to pass switch means shown in FIG. 2.

Connected to the arm 70, as shown in FIG. 4, is a movable switch member 72 which carries two pair of spaced electric contacts 74 and 75. In a low beam position shown in FIGS. 2 and 4, the contacts 74 engage the contacts 76 and 78 which are connected to output terminals 79 and provide electric potential to the low beam circuit of the vehicle headlights. Pivotal movement of the switch lever 16 in a counterclockwise direction in the orientation shown in FIG. 2 to change the beam, causes the detent 70 to extend from the housing of the second switch means 36 and slides the contacts 74 into electrical connection with the contacts 80 and 82 thereby switching electric potential to the vehicle high beam headlight circuit. The switch lever 16 will remain in this position until manual force is exerted to return the switch lever 16 to the center position shown in FIG. 2.

Pivotal movement of the switch lever 16 in the opposite direction, or clockwise in the orientation shown in FIG. 2, pushes the detent 70 into the housing of the second switch means 36 and moves the contacts 75 into connection with a pair of contacts 83 in the second switch means 36. This provides momentary electric potential to the vehicle high beam circuit for a flash to pass indication as long as the switch lever 16 is held in this pivoted position.

Figure 5:
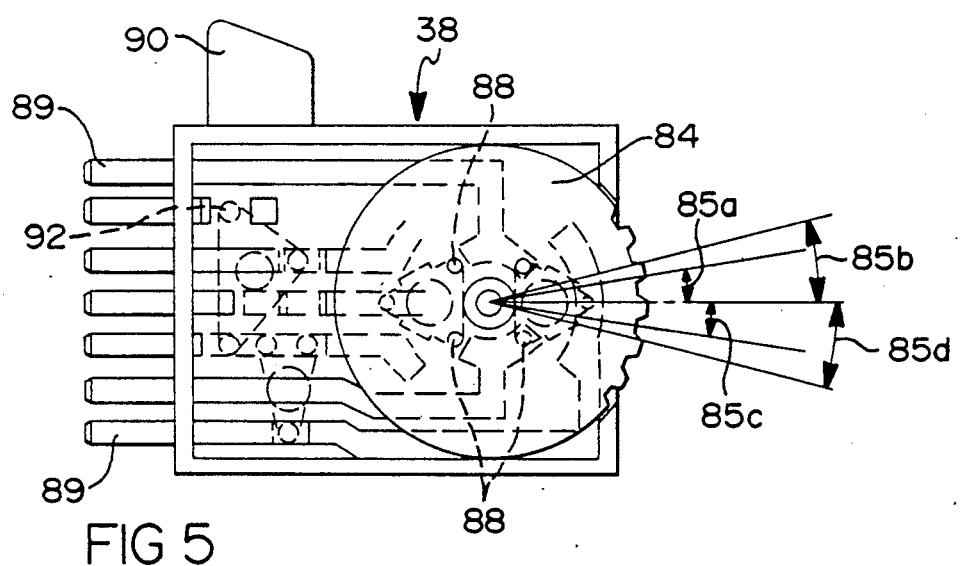
FIG. 5 is a left side elevational view of one embodiment of a turn signal and hazard light switch means shown in FIG. 2.

The third switch means 38, shown in detail in FIG. 5, is depicted by way of example as controlling the turn signal/hazard light circuit of a vehicle. The third switch means 38 contains a rotatable driven member 84 mounted in a housing which is engagable with the output member 87 of the third actuator means 30. The third actuator means 30, FIG. 2, includes output member 87 in the form of a linear gear rack which is coupled by a pin 86 to the rotor 17. The rack 87 is configured for movement when the switch lever 16 is pivoted in the first plane shown by reference number 18 in FIG. 1. Rotation of the switch lever 16 in a first direction indicating a right hand turn causes linear displacement of the rack 86 in the same direction and rotation of the plate 84 in the third switch means which is coupled by gear teeth to the rack 86. This rotation of the plate 84 to positions 85a or 85b causes contacts 88 carried by the plate 84 to connect to suitable leads or terminals 89 which will apply electric potential to the right hand turn signal of the vehicle. An opposite pivotal movement of the switch lever 16 indicating a left hand turn will rotate the plate 84 in the opposite direction to positions 85c or 85d and cause the contacts to engage other terminals 89 to apply electric potential to the left hand turn signals of the vehicle. A manually operated hazard switch 90 is mounted in the third switch means 38 and, when depressed, moves contacts 92 into electrical connection with certain terminals 89 to activate the hazard lights of the vehicle.

Figure 7:
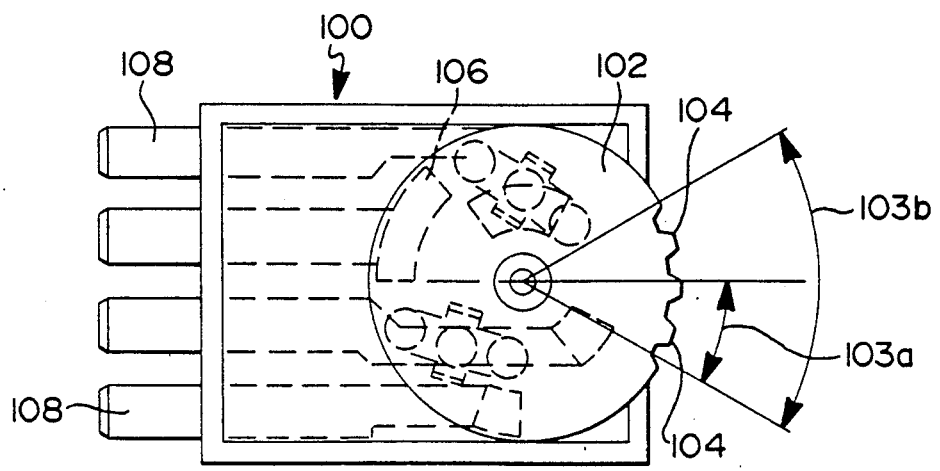
FIG. 7 is a left side elevational view of one embodiment of the headlight switch shown in FIG. 6.
Figure 6:
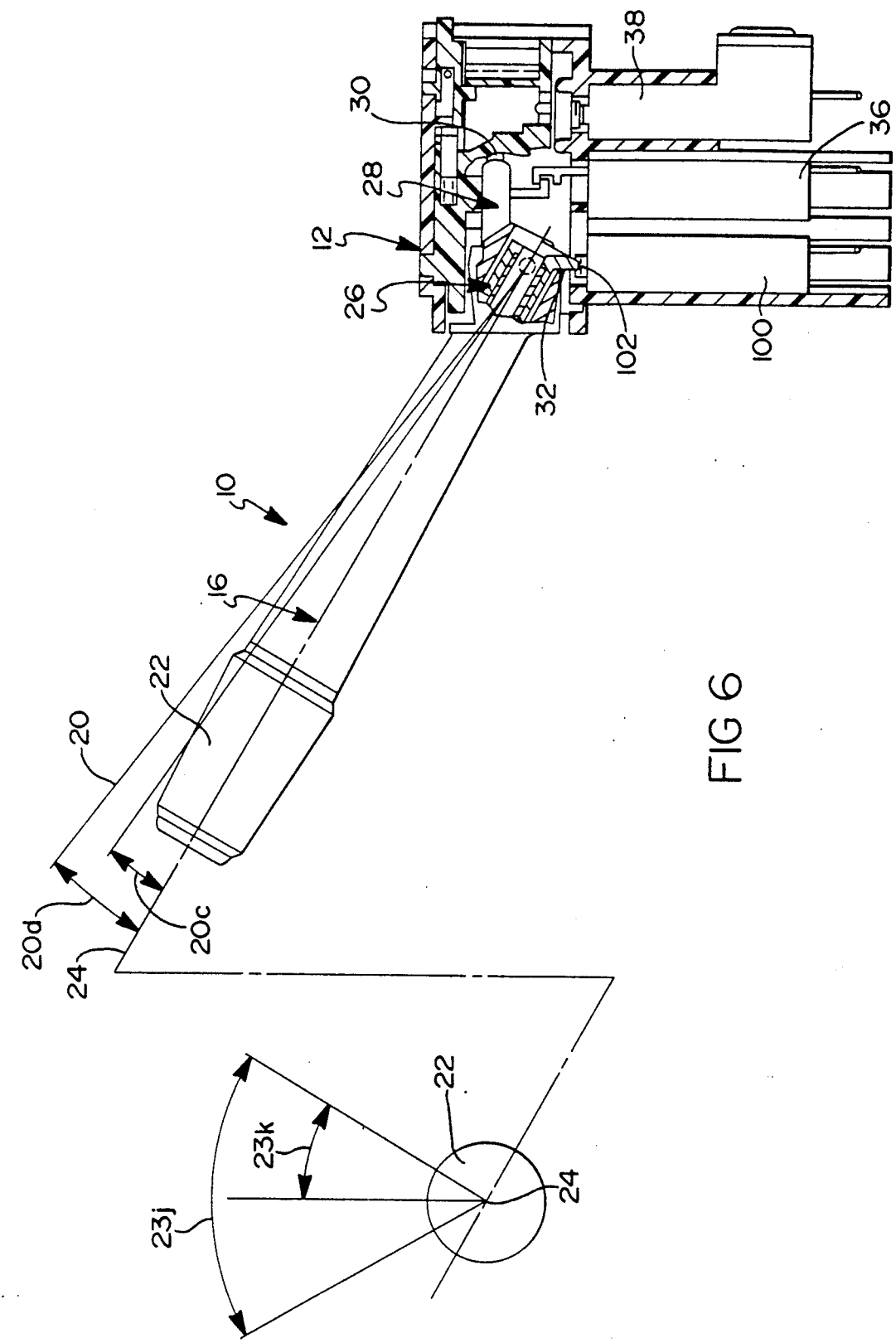
FIG. 6 is a partially cross sectioned, plan elevational view of another embodiment of the multifunction steering column switch of the present invention.

FIGS. 6 and 7 depict another embodiment of the steering column switch of the present invention. In this embodiment, the first, second and third actuator means 26, 28 and 30 are identical to that described above and shown in FIGS. 1 and 2. However, a fourth switch means 100 is operably coupled to the first actuator means 26. The fourth switch means 100 is designated, in this embodiment, as controlling the head lamps of the vehicle from an off position, shown by reference number 24 a parking lamp position 20b and energization of the headlights themselves upon pivotal movement of the switch lever 16 in the second plane 20 in the orientation shown in FIG. 6.

The fourth switch means 100 includes a driven member in the form of a sector gear 102 having gear teeth 104. The sector gear 32 in the first actuator means 26 engages the gear teeth 104 formed in the sector gear 102 and causes rotation of the sector gear 102 to positions 103a or 103b rotation of the end cap 22 of the switch lever 16 and the actuating rod 42. This rotation of the sector gear 102 causes rotation of arcuately shaped contacts 106 carried by the sector gear 102 into selective contact with leads connected to output terminals 108 extending from the fourth switch means 100. The terminals 108 are connected to the various headlight and parking lamp circuits to apply electric potential thereto depending upon the position of the sector gear 102 and the degree and direction of rotation of the end cap 22 of the switch lever 16.

FIG. 8 depicts an alternate embodiment of a switch means configurated to control the head lamp beam change and flash to pass operating circuits of a vehicle. The switch means 110 is similar to the switch means 36 shown in FIG. 4 in that it includes a linearly displaceable detent 70. A pair of spaced fingers 66 and 68 are formed on one end of the detent 70 and are engaged by the L-shaped arm 64 of the second actuator means 28 shown in FIGS. 1 and 6. A biasing return spring 111 is mounted in the housing of the switch means 110 and acts on a projection 112 carried by the detent 70 to normally bias the detent 70 outward from the housing of the switch means 110. A contactor 113 mounted on the detent 170 moves, with movement of the detent 70, from a normal position shown in FIG. 8 to a position bridging contacts mounted on pads connected to the terminals 79 which momentarily connect electric potential from the flash to pass feed terminal to the contact pad 115 attached to the terminals 79 connected to the high beam lamp circuits of the vehicle. Release of the switch lever 16 enables the return spring 111 to biasingly return the detent 70 to the normal, extended position breaking contact to the high beam lamp circuit.

A further angular movement of the switch lever 16, as shown in FIG. 6, will change the headlamps from a high to a low beam or from a low to a high beam condition. The switch means 110 includes a pawl 116 mounted on the detent 70. The pawl 116 engages a ratchet 117 carrying contacts which switch between bridging connections between a feed terminal 79, a low beam terminal and a high beam terminal in the switch means 110. With the ratchet 117 disposed in the position shown in FIG. 8 in which the contacts mounted on the ratchet 117 connect electric potential to the low beam terminal, initial movement of the switch lever 16 in the plane 20 to change the headlamp beam of the vehicle will cause the pawl 116 to ride along a surface on the ratchet 117 causing a rotation of the ratchet 117 in a clockwise direction, as shown in FIG. 8. This moves the contacts mounted on the ratchet 117 to a position shown in phantom in FIG. 8 in which the contacts bridge contact pads connected to the feed terminal and the high beam terminal 79. This switches electric potential to the high beam lamps of the vehicle. Release of the switch lever 116 causes the detent 70 to return to its normal extended position via the return spring 111 and returns the pawl 116 to the center position on the ratchet 117. A subsequent movement of the switch lever 116 to change the headlamp beams of the vehicle will cause the pawl 116 to again ride along the surface on the ratchet 117. However, since the ratchet 117 will be in a pivoted position from that shown in solid in FIG. 8 due to the above-described movement, the pawl 116 will engage an opposite surface on the ratchet 117 causing a counterclockwise rotation of the ratchet 117 to the position shown in solid in FIG. 8. This again connects electric potential to the low beam circuits of the vehicle.

FIGS. 9 and 10 depict another embodiment of a beam change and flash to pass switch means designed for low current applications. The switch means 119 shown in FIGS. 9 and 10 includes a linearly displaceable detent 120 having a perpendicularly shaped end finger 122 mounted thereon. The detent 120 carries a pair of spaced contacts 124 which selectively engage pairs of contacts 126 or 128 mounted in the housing of the switch means 119 and connected via contact pads to suitable output terminals, not shown, to generate signals selecting the high or low beam headlamps of the vehicle, as well as a momentary flash to pass energization of the vehicle high beam headlights.

Figure 11:
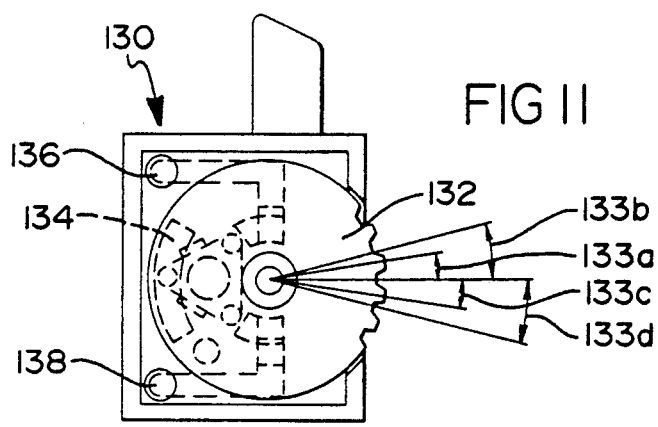
FIG. 11 is a left side elevational view of another embodiment of a turn signal and hazard light switch means.

Another embodiment of a turn signal and hazard light switch means 130 is shown in FIG. 11. The switch means 130 is also designed for low current applications and contains a rotatable disk 132 which is engaged via meshing gear teeth by an output member from one of the actuator means, such as actuator means 30. The rotatable disk 132 carries an arcuate shaped contact 134 which selectively engages contacts 136 or 138 mounted in the housing of the switch means 130 and generates signals on output terminals for the turn signal and hazard light circuits of the vehicle as the rotatable disk 132 rotates through positions 133a to 133d.

Figure 12:
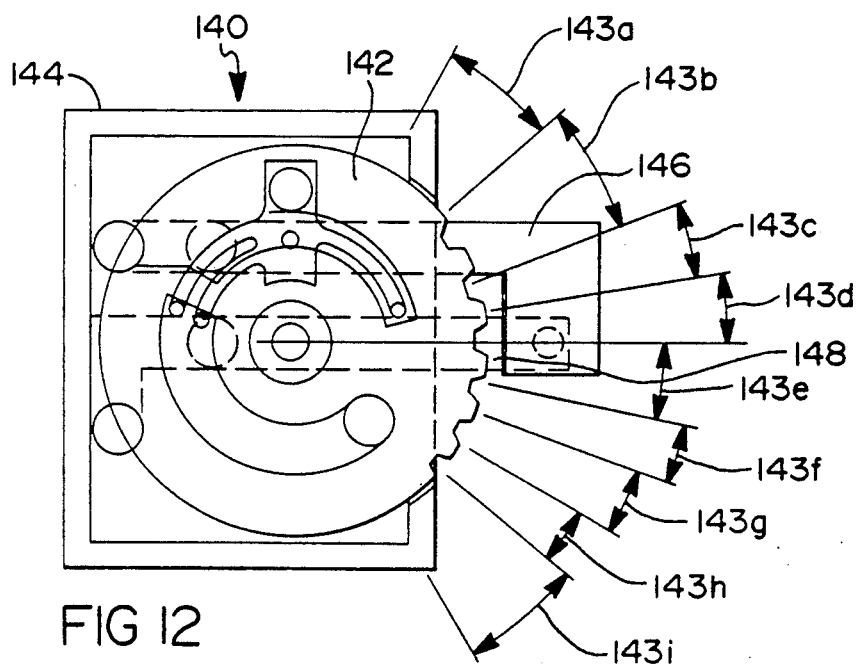
FIG. 12 is a left side elevational view of another embodiment of a windshield wiper switch means having an intermittent function.

Another embodiment of a low current windshield wiper switch means 140 is shown in FIG. 12. The switch means 140 is similar in function to the first switch means 34 shown in FIG. 3 and described above insofar as controlling the intermittent speeds, high and low constant speeds and the off position of the windshield wiper drive motor of a vehicle. In this embodiment, the switch means 140 includes a rotatable sector gear 142 which is engaged by the sector gear on one of the actuator means, such as the actuator means 26 shown in FIG. 2. Rotation of the sector gear 32 via rotation of the end cap 22 on the switch lever 16 is transmitted to rotation of the sector gear 142 through angular positions 143a to 143i thereby bringing contacts 144 carried on the sector gear 142 into alternating connection with contacts in the housing of the switch means 140 which are connected to output terminals to supply signals for the windshield wiper drive circuit of the vehicle. The switch means 140, shown in FIG. 12, is also provided with a momentary set of wash contacts 146 and 148 which function to momentarily connect electric potential to the windshield wash pump of the vehicle when the end of the switch lever 16 is depressed, as described above.

As seen in the above embodiments of the steering column switch of the present invention, the various actuator means, such as the actuators 26, 28 and 30, convert pivotal movement of the switch lever 16 in one of two mutually perpendicular planes 18 and 20 into corresponding movement of a switch means associated with each of the respective actuator means causing the switch means to change positions and thereby bring electric contacts carried by the switch means into connection with various leads in each switch means to connect electric potential to or generate signals for various vehicle operating circuits. Thus, pivotal or rotational movement of the switch lever 16 may be used to effect energization or de-energization of any of the vehicle operating circuits.

In this manner, the turn signal switch means 130, shown in FIG. 11, the switch means 38, shown in FIG. 5, and the switch means 34, shown in FIG. 3, are interchangeable since rotation of the rotatable end cap 22 on the switch lever 16 is converted by an actuator means, such as the actuator means 26, into rotary movement of the driven member of each of the switch means. This increases the versatility of the steering column switch of the present invention in that switch means modules controlling different vehicle operating circuits or functions may be interchanged in a single position in the housing or, in the alternative, may be repositioned to different positions to suit many different applications, vehicle configurations and use requirements.

Similarly, the actuators which provide linear displacement of the switch means, such as the switch means 36, 110 and 119 shown in FIGS. 4, 8, 9 and 10, may also be interchangeable and driven by one of the actuator means, such as the actuator means 28 shown in FIG. 2.

Figure 13:
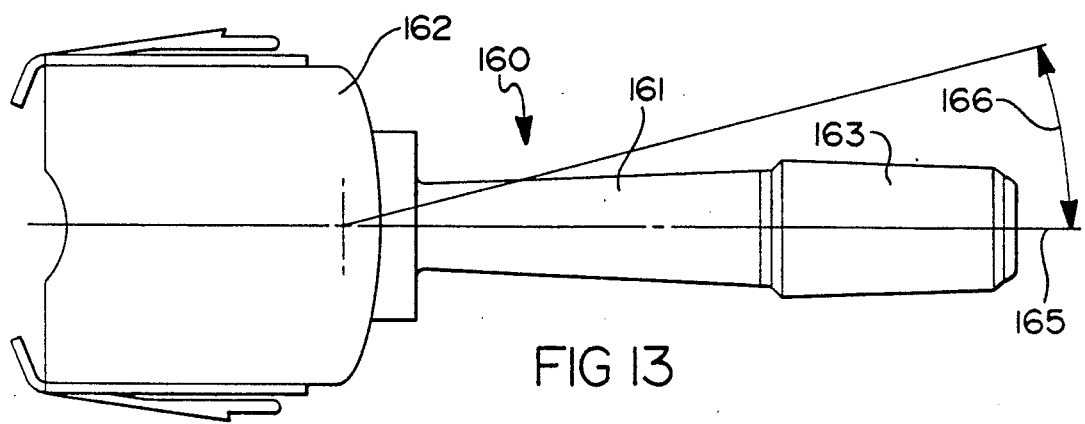
FIG. 13 is a front elevational view of a right hand steering column switch constructed in accordance with another embodiment of the present invention shown in a normal mounting position on the steering column of a vehicle.
Figure 14:
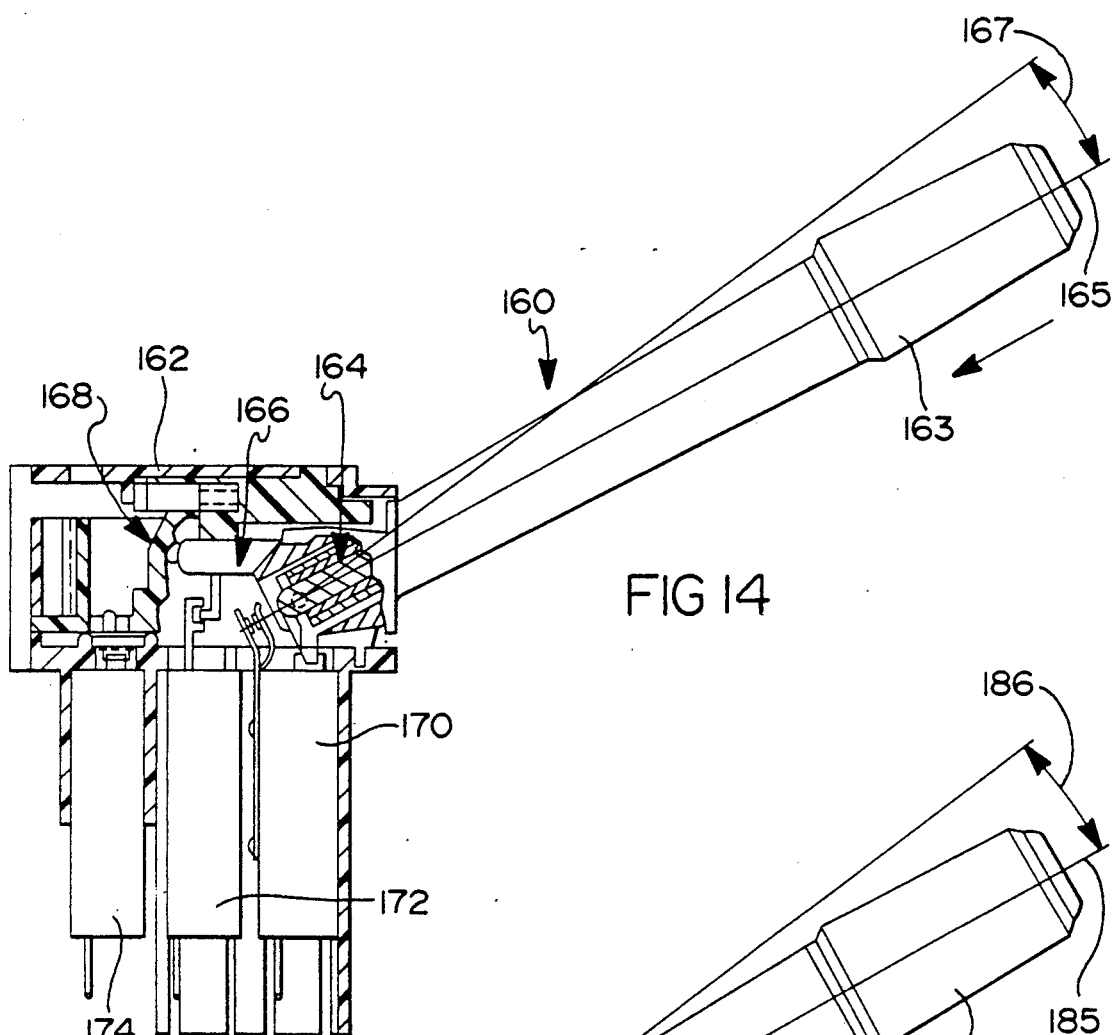
FIG. 14 is a partially cross sectioned, plan elevational view of the steering column switch shown in FIG. 13.

Referring now to FIGS. 13 and 14, there is depicted another embodiment of the steering column switch of the present invention which is adapted for mounting on the right hand side of the steering column to control various vehicle operating circuits. The steering column switch 160 is substantially identical to the steering column switch 10 described above in that it includes a pivotal switch lever 161 which is pivotally mounted within a housing 162 attached to the steering column of the vehicle. The switch lever 161 is mounted for pivotal movement in at least one of two mutually perpendicular planes 166, and 167, as well as having a rotatable end cap 163 which is rotatable about the longitudinal axis 165 of the switch lever 161.

Actuator means 164, 166 and 168, which are identical to the actuator means 26, 28 and 30 described above, are mounted in the housing 162 and are operably coupled to switch means 170, 172 and 174. The switch means 170, 172 and 174 may be constructed similarly as the switch means described above and used to apply electric potential to or signals for the windshield wiper and wash circuits, the rear window wash circuit and the rear wiper control circuit of the vehicle upon selected pivotal movement of the switch lever 161 and rotation of end cap 163 mounted thereon.

Figure 15:
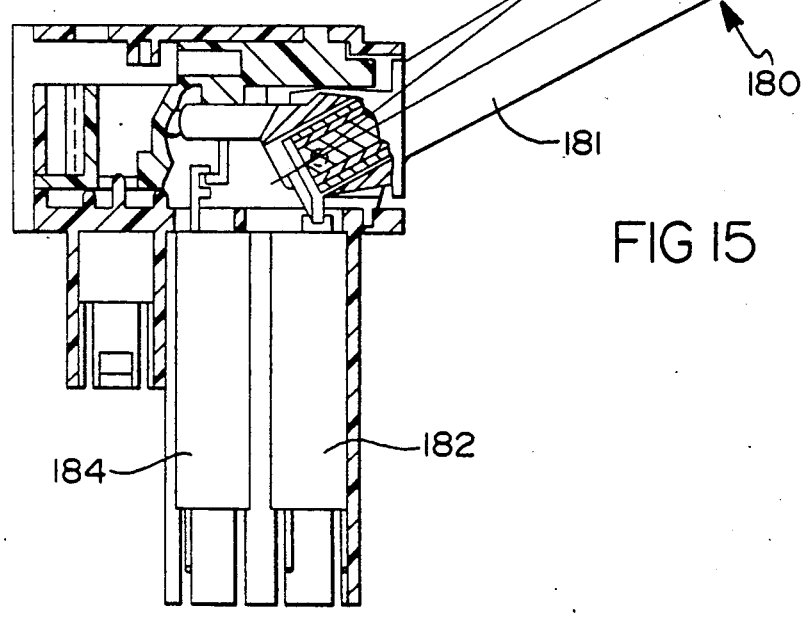
FIG. 15 is a partially cross sectioned, plan elevational view of another embodiment of the right hand steering column switch shown in FIG. 13.

Another embodiment of the steering column switch of the present invention is shown in FIG. 15. In this embodiment, the steering column switch 180 includes separate switch means 182 and 184 for controlling the operation of the vehicle windshield washer circuit and the vehicle windshield wiper circuit. The switch means 182 and 184 are respectively responsive to rotational movement of the end cap 183 mounted on the switch lever 181 about the longitudinal axis 165 of the switch 181 and pivotal movement of the switch lever 181 in one direction or plane 186 in the same manner as that described above.

In summary, there has been disclosed a unique multifunction steering column switch which provides a high degree of interchangability in the design of such steering column switches. The steering column switch of the present invention may be configured for controlling the application of electric potential to or the generation of signals for any of a variety of vehicle operating circuits upon selected pivotal or rotational movement of a switch lever mounted on the steering column switch. Design changes in any of the vehicle operating devices requires only a modification of an individual switch and not the entire steering column switch assembly since the actuator means transmitting pivotal or rotational movement of the switch lever to each individual switch means are independently mounted and independently operable from each other.

Further, the steering column switch of the present invention may be designed for mounting on either the left or right hand sides of a steering column thereby further increasing the number of vehicle function combinations in which the present invention may be used.

What is claimed is:

1. A steering column switch for a vehicle having a steering column and at least two energizable devices, the steering column switch comprising:
   a housing mountable on a steering column of a vehicle;
   a switch lever mounted in and extending outward from the housing, the switch lever connected to the housing for at least pivotal movement in first and second mutually perpendicular planes;
   first and second actuator means mounted in the housing, each of the first and second actuator means being independently constructed and operated and each of said actuating means being responsive to movement of the switch lever in one of the first and second mutually separate planes; and
   first and second switch means, each of said switch means being separately removably mounted in the housing, each of the first and second switch means coupled to and responsive to one of the first and second actuator means and switchable between positions to selectively generate electric signals for one of the energizable devices in the vehicle depending upon the mode of movement of the switch lever.

2. The steering column switch of claim 1 further including:
   the switch lever having a rotatable end portion rotatable about the longitudinal axis of the switch lever;
   a third rotation responsive actuator means removably mounted in the housing and coupled to the rotatable end portion of the switch lever for rotational movement therewith; and
   a third rotation responsive switch means, mounted in the housing and coupled to the third actuator means and switchable between positions, for selectively generating electric signals for one of the energizable devices associated therewith upon rotation of the rotatable end portion of the switch lever.

3. The steering column switch of claim 2 wherein the third rotation responsive switch means comprises:
   a rotatable member carrying electrical contacts, the rotatable member engaging the third rotation responsive actuator means coupled to the rotatable end portion of the switch lever for rotational movement between separate switchable states.

4. The steering column switch of claim 2 further comprising:
   the first actuator means being responsive to pivotal movement of the switch lever in the first plane;
   the second actuator means being responsive to pivotal movement of the switch lever in the second plane; and
   the third rotation responsive actuator means being responsive to rotation of the rotatable end portion of the switch lever.

5. The steering column switch of claim 1 wherein:
   one of the first and second actuator means includes an output member, the one of the first and second actuator means being responsive to pivotal movement of the switch lever in one of the first and second mutually separate planes for converting such pivotal movement of the switch lever into rotation of the output member.

6. The steering column switch of claim 5 wherein:
   one of the first and second switch means includes a driven member coupled to and responsive to rotation of the output member of the one of the first and second actuator means.

7. The steering column switch of claim 1 wherein:
   one of the first and second actuator means includes an output member, the one of the first and second actuator means being responsive to pivotal movement of the switch lever in one of the first and second mutually separate planes, for converting such pivotal movement of the switch lever into linear displacement of the output member.

8. The steering column switch of claim 7 wherein:
   one of the first and second switch means includes a driven member coupled to and responsive to linear displacement of the output member of the one of the first and second actuator means.

9. The steering column switch of claim 2 wherein:
   the third actuator means includes an output member, the third actuator means being responsive to rotation of the switch lever for converting such rotation of the switch lever to rotation of the output member.

10. The steering column switch of claim 9 wherein:
    the third switch means includes a driven member coupled to and responsive to rotation of the output member of the third actuator means.

11. A steering column switch for a motor vehicle having a steering column and at least two energizable devices, the steering column switch comprising:
    a housing mountable on a steering column of a vehicle;
    a switch lever mounted in and extending outward from the housing, the switch lever connected to the housing for pivotal movement in one plane, the switch lever including a rotatable end portion rotatable about a longitudinal axis extending through the switch lever;
    a plurality of actuator means mounted in the housing, each actuator means being independently constructed and operated and each being responsive to movement of the switch lever in one of the first plane and the rotational movement of the rotatable end portion of the switch lever; and
    a plurality of switch means each separately removably mounted in the housing, each switch means coupled and responsive to one of the actuator means and switchable between positions depending upon the mode of movement of the switch lever.

* * * * *